United States Patent
Herzberg

(10) Patent No.: US 10,287,733 B2
(45) Date of Patent: May 14, 2019

(54) ROAD PAVER WITH HOLDING DEVICE FOR CARRYING AND POSITIONING A SENSOR UNIT

(71) Applicant: JOSEPH VOEGELE AG, Ludwigshafen/Rhein (DE)

(72) Inventor: Ingo Herzberg, Angelbachtal (DE)

(73) Assignee: JOSEPH VOEGELE AG, Ludwigshafen/Rhein (DE)

( * ) Notice: Subject to any disclaimer, the term of this patent is extended or adjusted under 35 U.S.C. 154(b) by 0 days.

(21) Appl. No.: 15/458,276

(22) Filed: Mar. 14, 2017

(65) Prior Publication Data
US 2017/0292230 A1 Oct. 12, 2017

(30) Foreign Application Priority Data
Apr. 8, 2016 (EP) .................................. 16164466

(51) Int. Cl.
*E01C 19/42* (2006.01)
*E01C 23/01* (2006.01)
(Continued)

(52) U.S. Cl.
CPC .............. *E01C 19/42* (2013.01); *E01C 19/48* (2013.01); *E01C 23/01* (2013.01); *G01B 5/0002* (2013.01);
(Continued)

(58) Field of Classification Search
CPC ........ E01C 19/42; E01C 19/004; E01C 19/48; E01C 23/01; E01C 2301/04; E01C 2301/20; E01C 2301/10; E01C 19/4873
See application file for complete search history.

(56) References Cited

U.S. PATENT DOCUMENTS 3,710,695 A 1/1973 Miller et al.
4,543,006 A 9/1985 Wang
(Continued)

FOREIGN PATENT DOCUMENTS

CN 102828458 A 12/2012
CN 102828459 A 12/2012
(Continued)

OTHER PUBLICATIONS

European Search Report dated Sep. 13, 2017, Application No. 17163505.5-1614, Applicant Joseph Voegele AG, 7 Pages.
(Continued)

*Primary Examiner* — Abigail A Risic
(74) *Attorney, Agent, or Firm* — Brooks Kushman P.C.

(57) ABSTRACT

A road paver includes a paving screed adjustable in height for installing a road surface layer and at least one holding device for carrying and positioning of at least one sensor unit. The holding device has at least one swivel arm module for fastening the holding device on the road paver, at least one carrier arm module and at least one sensor module comprising the sensor unit. The carrier arm module is fastened by a first clamping device on the swivel arm module and the sensor module is fastened by a second clamping device on the carrier arm module, wherein the first and the second clamping device are formed respectively for a predetermined clamping force when the respective clamping devices are in a closed position.

16 Claims, 7 Drawing Sheets

(51) Int. Cl.
*E01C 19/48* (2006.01)
*G01B 5/00* (2006.01)
(52) U.S. Cl.
CPC ........ *G01B 5/0004* (2013.01); *E01C 2301/04* (2013.01); *E01C 2301/20* (2013.01)

(56) References Cited

U.S. PATENT DOCUMENTS

| | | | |
|---|---|---|---|
| 5,058,239 A | 10/1991 | Lee | |
| 5,258,961 A | 11/1993 | Sehr et al. | |
| 5,393,167 A | 2/1995 | Fujita et al. | |
| 5,599,134 A * | 2/1997 | Macku | E01C 19/008 404/84.1 |
| 5,975,473 A * | 11/1999 | Haas | E01C 19/006 172/4 |
| 6,729,596 B2 * | 5/2004 | Fumado Gilabert | E01C 19/004 248/550 |
| 8,702,344 B2 | 4/2014 | Hanfland | |
| 9,032,983 B2 | 5/2015 | Jin | |
| 9,033,611 B2 | 5/2015 | Hanfland et al. | |
| 2004/0056170 A1 | 3/2004 | Fumado Gilabert | |
| 2014/0356050 A1 | 12/2014 | Yu et al. | |
| 2017/0292230 A1 | 10/2017 | Herzberg | |
| 2017/0292231 A1 | 10/2017 | Herzberg | |

FOREIGN PATENT DOCUMENTS

| | | |
|---|---|---|
| CN | 203629600 U | 6/2014 |
| CN | 207121792 U | 3/2018 |
| DE | 69126017 T2 | 11/1997 |
| DE | 60226237 T2 | 5/2009 |
| EP | 1 403 434 A1 | 3/2004 |
| EP | 3 228 747 A1 | 10/2017 |
| JP | 56-82010 U | 7/1981 |
| JP | 63-147003 A | 6/1988 |
| JP | 2-261105 A | 10/1990 |
| JP | 3-199501 A | 8/1991 |
| JP | 4-41802 A | 2/1992 |
| JP | 4-108904 A | 4/1992 |
| JP | 4-179710 A | 6/1992 |
| JP | H4-179705 A | 6/1992 |
| JP | 4-77610 U | 7/1992 |
| JP | 6-8410 U | 2/1994 |
| JP | 7-127017 A | 5/1995 |

OTHER PUBLICATIONS

Japanese Office Action dated Jun. 20, 2017, Dispatch No. 261585, Application No. 2017-032345, 7 Pages.
European Search Report dated Jun. 24, 2016, Application No. EP 16164466, Applicant Joseph Voegele AG, 5 Pages.
Chinese Search Report dated Mar. 29, 2018, Application No. 2017101473241, 2 Pages.
Chinese Office Action dated Apr. 4, 2018, Application No. 201710147324.1, 3 Pages.
European Communication dated Jan. 31, 2018, Application No. 17 163 505.5-1002, Applicant Joseph Voegele AG, 5 Pages.
European Search Report dated Oct. 12, 2016, Application No. EP 16164470.3-1604, Applicant Joseph Voegele AG, 6 Pages.
Japanese Office Action dated Jun. 1, 2018, Dispatch No. 236817, Application No. 2017-075809, 3 Pages.
U.S. Office Action dated Apr. 17, 2018, U.S. Appl. No. 15/480,866, 15 Pages.
U.S. Notice of Allowance dated Nov. 6, 2018, U.S. Appl. No. 15/480,866, 11 Pages.
U.S. Office Action dated Dec. 27, 2018, U.S. Appl. No. 15/938,573, 29 Pages.
Amendment Under 37 C.F.R. 1.111 Dated Jan. 31, 2019, U.S. Appl. No. 15/938,573, 10 Pages.
Japanese Office Action dated Mar. 4, 2019, Application No. 2018-062582, 3 Pages.

* cited by examiner

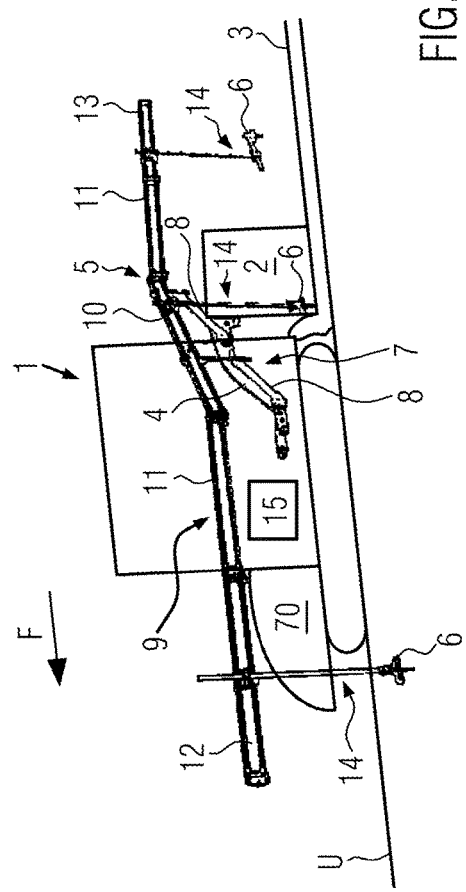
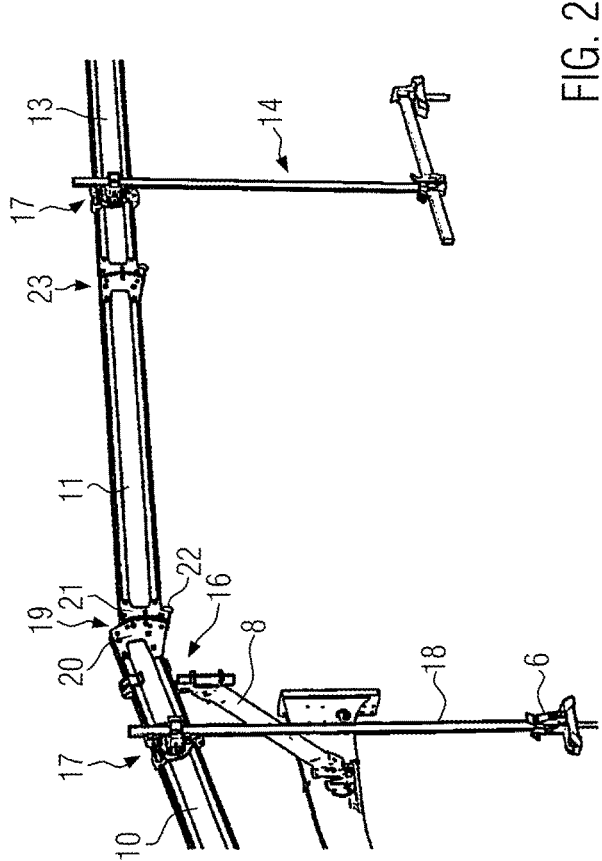

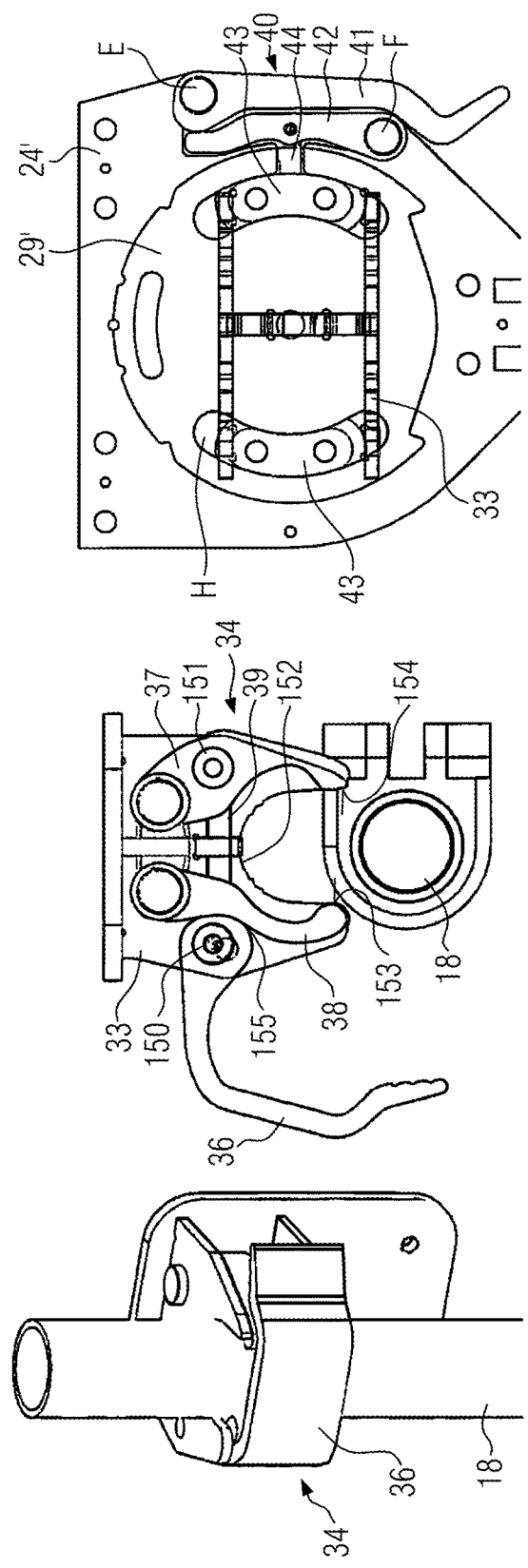

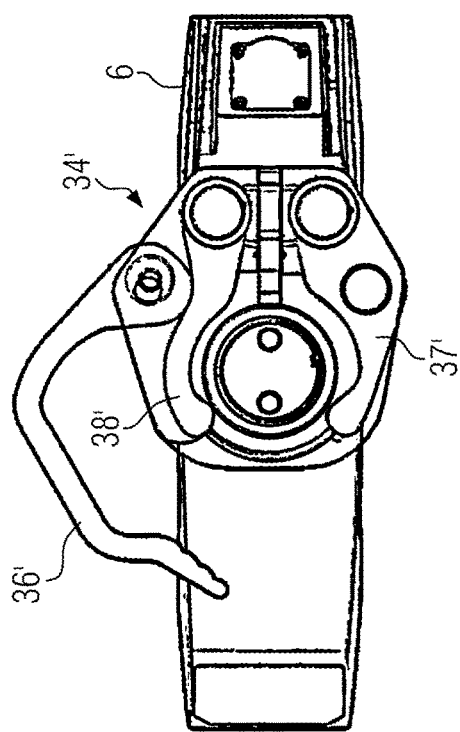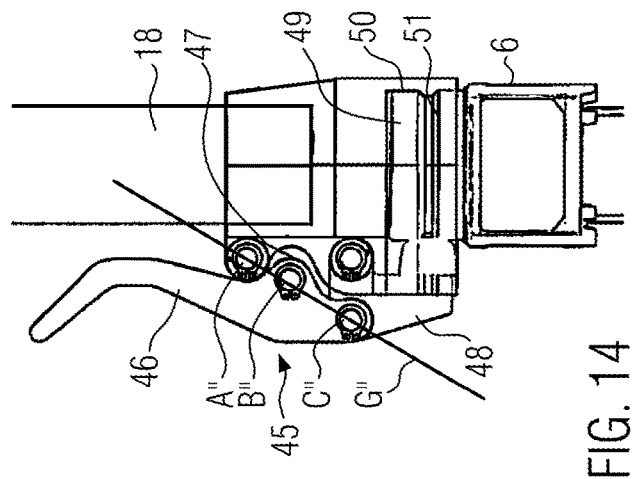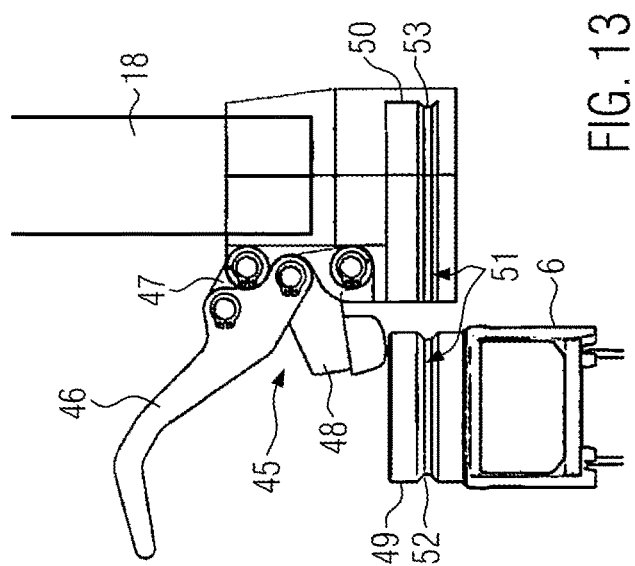

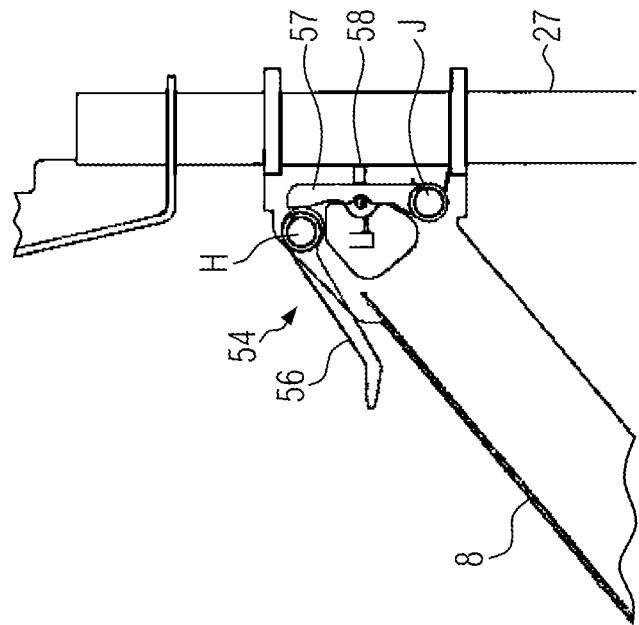
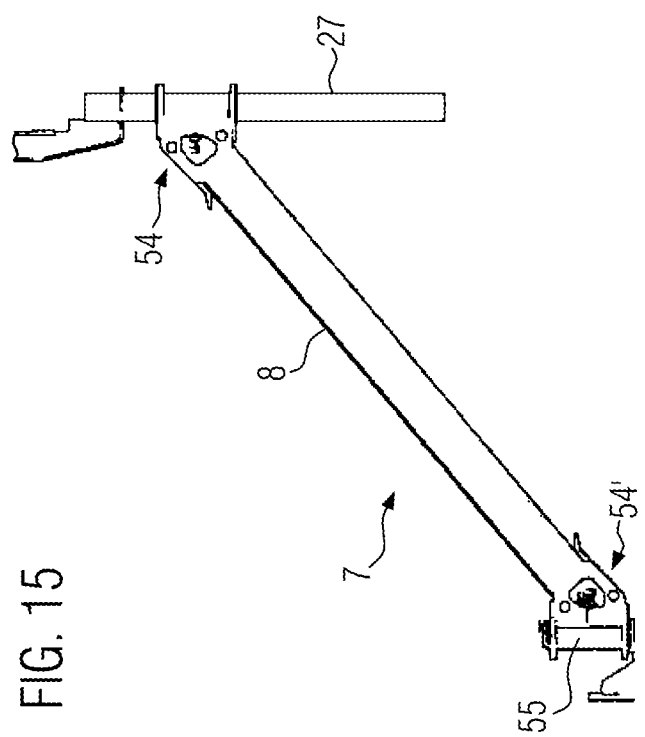

ROAD PAVER WITH HOLDING DEVICE FOR CARRYING AND POSITIONING A SENSOR UNIT

CROSS-REFERENCE TO RELATED APPLICATIONS

This application claims foreign priority benefits under 35 U.S.C. § 119(a)-(d) to European patent application number EP 16164466.1, filed Apr. 8, 2016, which is incorporated by reference in its entirety.

TECHNICAL FIELD

The present disclosure relates to a road paver according to the generic term.

BACKGROUND

In practice, road pavers are used to install new road surfaces by means of a paving screed installed on them. The paving material to be used comes from a material hopper of the road paver that is disposed at the front of the road paver when seen in the installation direction. Through a material conveyor, the paving material is transported out of the material hopper rearwards to the paving screed, spread out by said paving screed by means of a spreading auger and finally installed to form a new road surface under the paving screed by means of heated densification aggregates.

To enable the installation of an even road surface on a ground, on which the road paver is moved, the paving screed is fastened on the chassis of the road paver by means of screed arms with an adjustable height. Leveling of the paving screed can be controlled by a control unit of the road paver. In this process, leveling of the paving screed depends on the surface texture of the ground and/or on the target thickness of the road surface to be installed.

It is known that, for leveling a paving screed of a road paver, an elongated, rigid measurement bar is attached laterally on the road paver that positions a plurality of sensors on one hand above the ground, on which the road paver moves, as well as above the newly installed road surface layer behind the paving screed. It is problematic for known measurement bar supports that they are heavy, that their assembly is time-consuming and that in particular the installation on the road paver requires a high degree of skill and several people.

For example, the DE 602 26 237 T2 shows a measurement bar device with bars disposed on top of one another that can be extended telescopically along the road paver to position sensors for a height measurement above the ground next to the sides of the road paver. The respective telescopic bar segments can be fastened at a desired point by means of fixtures provided on it. In addition, the respective height positions of the sensors can be adjusted. This comes with the disadvantages of the telescopic measurement bars having a heavy weight so that they can only be used on special road paver types. In addition, several people are required for installation and/or deinstallation of the measurement bar device on and/or from the road paver. Besides, the possibilities with regard to installing the sensors at a certain height are limited. Finally, the sensors are held on the measurement bar by different clamping forces, which depends on the force of the adjuster, so that a new adjustment of the measurement bar device could lead to difficulties.

U.S. Pat. No. 5,975,473 A discloses a measurement bar device that is attached on the sides of a road paver. The measurement bar device is fastened on a screed arm of the road paver by means of flexible swivel arms. Furthermore, the measurement bar device comprises a measurement bar, which is supported laterally along the road paver, with a central bar as well as with extending bars fastened on the ends of said central bar. Height measurement sensors are disposed respectively on the central bar as well as on the extending bars. The respective extending bars can be swiveled inwards in relation to the central bar in a horizontal direction so that the sensor fastened on the rear extending bar at the back of the road paver can be positioned above the newly installed road surface layer behind the paving screed. In this measurement bar device, the respective segments, which are connected flexibly to one another, are coupled by means of threaded screw joints. Assembly is therefore very work-intensive and time-consuming. In addition, different clamping forces act on the respective threaded screw joints, which ultimately depends on the strength of the operator who adjusts the holding device. This complicates installation and adjustment of the holding device and keeps the device from being equally easy to install for everyone. Moreover, it is not rare for such a complex measurement bar device that individual components, in particular loose screw levers, screws and brackets, get lost at the construction site. Eventually, the possibilities to set appropriate height positions for the sensors are limited for this measurement bar device.

DE 691 26 017 T2 discloses a road paver with a measurement bar fastened on it, which is formed rigidly and positioned laterally of a screed arm of the road paver above the ground. This comes with the disadvantage of the measurement bar being in particular only usable in a limited number of road paver types due to the rigid design of said measurement bar.

SUMMARY

In view of the conventional solutions according to the state of the art, a purpose of the disclosure is to provide a road paver with a holding device that is suitable for a particularly flexible application to be used in different road paver types, that is further characterized by simple and easy installation on the road paver, that is ergonomically operable as a whole and that is in addition suitable for a variety of support possibilities for modules fastened on it, in particular measurement units.

A road paver according to the disclosure comprises a paving screed adjustable in height for installing a road surface layer and at least one holding device for carrying and positioning of at least one sensor unit. The holding device comprises at least one swivel arm module for fastening the holding device on the road paver, at least one carrier arm module and at least one sensor module that comprises the sensor unit. In the disclosure, the carrier arm module is fastened by means of a first clamping device on the swivel arm module and the sensor module is fastened by means of a second clamping device on the carrier arm module.

According to the disclosure, the first and the second clamping device are each formed for a predetermined clamping force when the respective clamping devices are in a closed position. Hence, the two clamping devices of the disclosure apply constant holding forces onto the modules to be held in the closed position, regardless of the actuating force of the adjuster. This implies that overstretching on the coupling points can be prevented and that the clamping devices can always be opened and closed while similar actuating forces are being applied. This always ensures a particularly ergonomic handling for the holding device as a whole, i.e., for its mountability on the road paver, adjustability for the sensors and their modular assembly.

In addition, the holding device can be easily upgraded, practically as a modular building kit, in an excellent way on different road paver types for diverse fields of application. Depending on the case of use, it can be configured module-specifically on a road paver and is therefore suitable for numerous cases of use. In the disclosure, in particular the ergonomic handling of the two clamping devices is an advantage for the different configuration possibilities.

Through the application of constant clamping forces, in particular damages on the holding device can be prevented as well. Further, it is advantageous for the holding device that it can be installed without using tools. Screw connections that are used in known solutions and that required installation tools do not exist in the disclosure.

The two clamping devices form well-conceived fastening systems that are each formed in particular as quick-release devices. Therefore, the holding device is ready to use on the road paver particularly fast so that deadtimes for the installation can be reduced significantly. The respective quick-release devices predefine the respective clamping forces that have to be applied in order to secure components correctly on said devices. In the disclosure, the sensor units used on the holding device can be aligned in any way in relation to different measurement references and/or measurement positions. Therefore, the holding device can be used in a plurality of application cases based on customers' requirements. In particular, the respective sensors can be positioned in a particularly versatile manner in case of the disclosure.

Overstretching and/or too loose tightening of the two clamping devices can therefore be prevented. In addition, the operator can visually check on the quick-release devices without any problem whether modules to be carried are held correctly on said devices, i.e., whether the quick-release devices are in the closed position. In particular, sensor units fastened on said quick-release devices will consequently no longer fall down and/or be lost during the installation run.

It is also advantageous for the predetermined clamping force to be applicable on the respective clamping devices regardless of an actuating force. If the respective clamping devices are in the closed position, the adjuster can also assume that the predetermined clamping forces, which are thereby applied by means of the two clamping devices, are sufficient for safe holding of components to be fastened.

On the clamping devices, a switch between an opened and a closed position can in particular be ensured without any problem if the first and/or second clamping device comprises a lever clamping gear mechanism. Through the leverage and gear effect, the clamping devices can each be set to the closed and open position by means of applying weak actuating forces. The lever clamping gear mechanism is suited in particular for fastening sensitive and costly modules, for example for fastening the sensor module.

The lever clamping gear mechanism preferably comprises an actuating lever for opening and closing the respective clamping device, a support lever as well as a clamping lever that applies the predetermined clamping force for fastening on the carrier arm module. In particular, the operator can notice on the actuating lever, during opening and closing of the lever clamping gear mechanism, when said lever reaches a maximum pressure point, i.e., when it has been moved out of the opened or closed position by a predetermined angle, a maximum force, wherein in particular during the closing process after reaching this force, the lever clamping gear mechanism can be set completely to the closed position in a somewhat self-effective way, in any case without any major effort. Likewise, this maximum force around the pressure point, which exists on the lever clamping gear mechanism, prevents the lever clamping gear mechanism from opening automatically out of the closed position.

The first and/or second clamping device preferably comprises at least one supporting hook that is formed as an abutment for fastening on the carrier arm module. The supporting hook thereby acts as an abutment for the lever clamping gear mechanism. The respective clamping devices can consequently be fastened in a particularly stable way, in particular in a slide-proof manner, on the carrier arm module.

The carrier arm module can be held particularly firmly by the respective clamping devices if the clamping lever and the supporting hook are coupled to it on opposite sides of the carrier arm module, if the first and/or second clamping device is closed. Together with the supporting hook, the clamping lever thereby forms a claw to absorb the carrier arm module.

According to a particularly advantageous embodiment, the following turning points of the lever clamping gear mechanism are designed in a closed position of the first and/or second clamping device in such a way that a turning point between the support lever and the actuating lever is located at least partially on an imaginary straight line between a turning point situated on an inlet of the support lever and a turning point situated between the clamping lever and the actuating lever. Such a position of the respective turning point enables a sufficiently high self-locking effect through the respective lever clamping gear mechanism and therefore prevents the lever clamping gear mechanism from opening automatically during the installation drive. This is supported in particular by an end stop being fastened on one of the levers that is formed in the lever clamping gear mechanism that ensures that said lever clamping gear mechanism will not open automatically but that it can only be opened if a defined actuating force is applied for opening on the actuating lever. In addition, the end stop on the lever prevents overstretching of the lever clamping gear mechanism, whereby components that are possibly fastened on said gear mechanism, in particular a sensor unit, could be damaged. In this context, the end stop can be understood in the sense of the previously described maximum force on the pressure point.

Preferably, a central beam of the carrier arm module, which is aligned in an inclined way towards the horizontal plane when projected on a vertical projection plane, can be fastened detachably on the first and/or second clamping device. The central beam offers a stable basis for the support device in order to fasten further beam segments as well as in particular the sensor module on it. By means of the clamping devices, the central beam can be installed fast and above all in an accurately positioned way by an operator without the need for further auxiliary staff.

Preferably, the holding device further comprises at least one extension beam for the central beam and at least one fastening unit that fastens the extension beam detachably on an end of the central beam. In particular, the central beam and the extension beam can be connected by means of the fastening unit, relatively to one another in a first installation angle and in at least one further installation angle when viewed in a vertical projection plane.

Preferably, the central beam and the extension beams fastened on its ends can form a step shape. The step shape ensures that a sensor unit can be positioned above the ground on which the road paver moves at the same distance of altitude as another sensor unit above the newly installed road surface layer.

The step-shaped structure, however, comes with the substantial advantage, in particular during installation, that the holding device will not collide with other components of the road paver, for example screed extension parts, duct plates and/or brackets for said road paver. During installation of large installation widths, extension parts of the paving screed and/or duct plates, which are arranged ahead of the extension parts in relation to lateral spreading augers when seen in the direction of travel, can be fastened vertically and horizontally by means of projecting support bars. The step-shaped structure of the holding device thereby allows for the use of such support bars, wherein the holding device itself will not be disturbed in its function by said support bars.

The first and/or second clamping device preferably has a holding part and a rotary disc coupled to said holding part, which are installed rotatably and within a predetermined angle in relation to one another. Therefore, the central beam can be installed on the road paver obliquely in relation to the horizontal plane, wherein the carrier arm module is excellently suited for fastening a screed arm of the paving screed. Furthermore, the rotary joint allows for positioning of the sensor module in a way that is vertically aligned to the ground when said sensor module is fastened on the obliquely inclined central beam.

Preferably, the holding part on the first clamping device is installed rotatably in relation to the rotary disc when the carrier arm module is fastened on the swivel arm module through the first clamping device, and the rotary disc on the second clamping device is installed rotatably in relation to the holding part when the sensor module is fastened on the carrier arm by means of the second clamping device. Therefore, both the carrier arm module can be aligned at a predetermined swivel angle to the horizontal plane by means of the first clamping device as well as the sensor module can be aligned at a predetermined swivel angle to the horizontal plane by means of the second clamping device. The respective clamping devices can consequently connect the respective modules to one another in a versatile way.

In particular, the holding part and the rotary disc can be fastened in relation to one another against rotation so that a set swivel angle between the holding part and the rotary disc will not be misadjusted during the installation drive. This ensures stable assembly of the holding device.

Preferably, a lever clamping gear mechanism formed on the rotary disc of the second clamping device is an eccentric quick-release device for securing a sensor tube of the sensor module. The sensor module can thereby be coupled stably to the second clamping device without having to apply high forces. Due to the eccentric quick-release device, in particular the use of further tools to fasten the sensor module will become unnecessary.

A particularly accurate and stable installation for the sensor unit will be ensured by the sensor module if said module comprises a sensor inlet, wherein the sensor unit can be positioned in the sensor inlet preferably by means of a tongue and groove connection. The sensor unit can therefore always be led accurately into the sensor inlet and fastened correctly in said sensor inlet.

The sensor unit can preferably be fastened against rotation by a lever clamping gear mechanism associated with the sensor module. Therefore, the sensors always remain aligned as originally set, which leads to a constant measurement result.

Preferably, the lever clamping gear mechanism is an eccentric quick-release device in order to fasten the sensor unit on the sensor module. By means of the eccentric quick-release device, a predetermined clamping force can be applied so that damage-causing forces, which might arise for example due to too strong tightening and/or overstretching of a fastening device for the sensor unit.

A lever clamping gear mechanism associated to the swivel arm module is preferably an eccentric quick-release device through which the first clamping device can be fastened on the swivel arm module. Therefore, the first clamping device can be fastened fast and easily on the swivel arm module.

According to a further embodiment, the swivel arm module comprises at least partially a guiding section and the carrier arm module a sliding part, which is installed adjustably along the guiding section and which can be fastened on said guiding section by means of the first clamping device. Such a swivel arm module and/or carrier arm module can be fastened particularly well on the road paver at a low altitude above the ground and is excellently suited to provide only one sensor unit on the holding device.

Preferably, the sliding part is a profile tube and the guiding section is hollow to absorb the profile tube. Therefore, an overhanging length laterally besides the road paver can be set for the holding device without any effort.

Preferred embodiments of the disclosure will be explained based on the following figures.

BRIEF DESCRIPTION OF THE DRAWINGS

FIG. 1 shows a road paver for installing a road surface with a holding device for carrying and positioning of several sensors;

FIG. 2 shows an enlarged display of a section of the holding device from FIG. 1;

FIG. 9 shows a clamping device, in particular to be used for holding a sensor tube;

FIG. 10 shows a section view of the clamping device from FIG. 9 for holding a sensor tube;

FIG. 11 shows a rotary clamping device of the first and second clamping device;

FIG. 12 shows an eccentric clamping device for fastening a sensor unit;

FIG. 13 shows a lever gear mechanism clamping device for fastening the sensor unit in an open position;

FIG. 14 shows the lever joint clamping device from FIG. 13 in a closed position;

FIG. 15 shows a swivel arm of the holding device for positioning the first clamping device from FIG. 3;

FIG. 16 shows an enlarged display of an upper clamping device of the swivel arm from FIG. 15;

Figure 5:
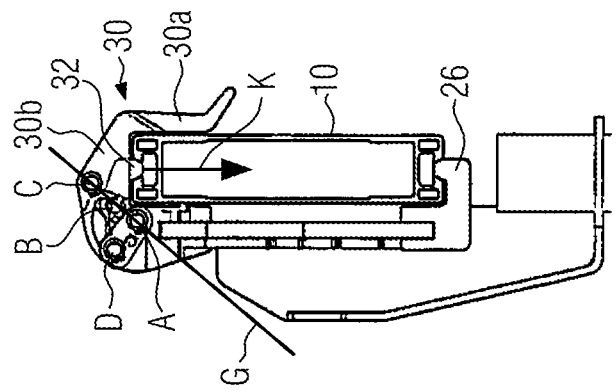
FIG. 5 shows the first clamping device in a closed position with the central beam fastened on it.

Identical components are marked continuously with the same reference signs in the Figures.

DETAILED DESCRIPTION

As required, detailed embodiments are disclosed herein; however, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

FIG. 1 shows a road paver 1 with a height-adjustable paving screed 2 for installing a new road surface layer 3 on a ground U. The road paver 1 has a material hopper 70 that is arranged at the front when viewed in the direction of travel F and out of which paving material is transported to the paving screed 2 at the back for installation by means of a material conveyor unit that is not shown.

The paving screed 2 comprises a screed arm 4 on which a holding device 5 is fastened. The holding device 5 is formed for carrying and positioning of multiple sensor units 6. The holding device 5 comprises a swivel arm module 7 for fastening the holding device 5 on the road paver 1. The swivel arm module 7 comprises two swivel arms 8 that are fastened laterally on the screed arm 4. Further, the holding device 5 comprises a carrier arm module 9 with a central beam 10 and extension beams 11 fastened on the ends of said central beam 10. The central beam 10 is carried laterally on the road paver 1 by the two swivel arms 8 and with an inclination to the horizontal plane. The two extension beams 11 at the ends of the central beam 10 are parallel to one another so that the central beam 10 forms a step shape together with the extension beam 11.

FIG. 1 further shows that, when viewed in the direction of travel F, respectively one sensor module 14 is fastened on a front extension beam 12, on the central beam 10 as well as on a rear extension beam 13. The sensor unit 6 is fastened on the respective ends of the sensor modules 14. The two front sensor modules 14 are positioned for a distance measurement above the ground U on which the road paver 1 is moving. The sensor module 14 fastened on the rear extending beam 13 is positioned above the new road surface layer 3 in order to perform a distance measurement in relation to said road surface layer. Based on the respective distance measurement, a control unit 15 formed in the road paver 1 can perform automated leveling of the paving screed 2 in order to create an even road surface layer 3 even when driving on an uneven ground.

FIG. 2 shows a section of the holding device 5 from FIG. 1. A first clamping device 16 is fastened on an upper end of the swivel arm 8. The first clamping device 16 is fastened on an upper section of the central beam 10 and keeps the central beam 10 in an inclined position in relation to the horizontal plane.

On the left next to the first clamping device 16, a second clamping device 17 is fastened on a side of the central beam 10 that faces away from the first clamping device 16 in FIG. 2. The second clamping device 17 is formed to hold the sensor module 14, in particular a sensor tube 18 formed on the sensor module 14 in order to position the sensor unit 6, which is fastened on a lower end of the sensor tube 18, above the ground U. FIG. 2 further shows that another second clamping device 17 is fastened on the rear extension beam 13 next to the extension beam 11 in order to position a sensor module 14 behind the paving screed 2 as illustrated in FIG. 1.

The second clamping device 17 shown in FIG. 2 can be clamped onto both sides of the central beam 10 and the extension beam 11, i.e., in relation to the road paver 1 both on the inside as well as on the outside of the central beam 10 and/or of the extension beam 11, regardless of the installation side of the first clamping device 16.

FIG. 2 also shows that the central beam 10 is connected to the extension beam 11 on its rear end by means of a fastening unit 19. The fastening unit 19 comprises a hanging slot 20 that is formed on the rear end of the central beam 10 and a locking plate 21 that is formed on a front end of the extension beam 11. A spring-loaded locking bolt 22 is arranged flexibly on the locking plate 21 to create a lock with the hanging slot 20.

In FIG. 2, the extension beam 11 and the rear extension beam 13 are connected by means of a further fastening unit 23. The further fastening unit 23 comprises the same components as the fastening unit 10 but is connected in another locking position so that the extension bolt 11 is assembled with the rear extension beam 13 in a horizontally aligned position. The central beam 10 and the extension beam 11, by contrast, are coupled to one another at an obtuse assembly angle via the fastening unit 19.

Figure 3:
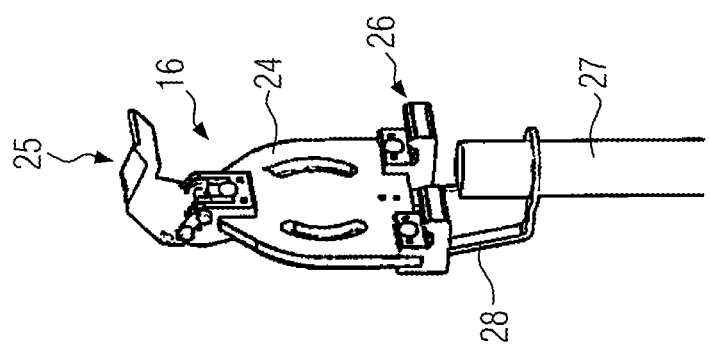
FIG. 3 shows a first clamping device of the holding device.

FIG. 3 shows the first clamping device 16 in an open position. The first clamping device 16 comprises a holding part 24, a lever clamping gear mechanism 25 as well as two supporting hooks 26. Likewise, the first clamping device 16 could also comprise only one supporting hook 26. In FIG. 3, the lever clamping gear mechanism 25 is formed as a quick-release device for fastening the central beam 10 on the first clamping device 16 by means of a predetermined clamping force. The supporting hooks 26 thereby interact as abutments with the lever clamping gear mechanisms 25 so that inadvertent movements of the central beam 10 are not possible. Further, the first clamping device 16 comprises a holding tube 27 with a connecting bracket 28.

Figure 4:
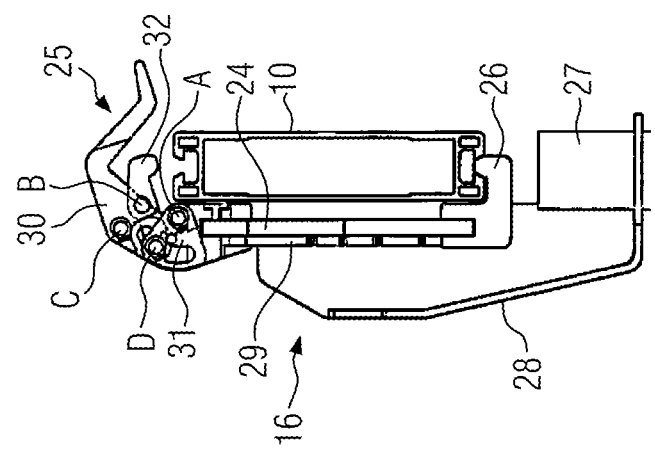
FIG. 4 shows the first clamping device from FIG. 3 with a central beam inserted in it.

FIG. 4 shows a section through the first clamping device 16 with the central beam 10 in the first clamping device 16 sitting on the supporting hook 26. The lever clamping gear mechanism 25 in FIG. 4 is still in the open state. FIG. 4 also shows that a rotary disc is positioned behind the holding part 24, whereby the holding part 24 including the supporting hooks 26 fastened on it and the lever clamping gear mechanism 25 are installed rotatably in relation to the rotary disc 29 within a predetermined angle. As a consequence, the central beam 10 can be swiveled and positioned by the first clamping device 16 within the predetermined angle if it is installed in the first clamping device 16. Further, this leads to the holding part 24, which is provided on the first clamping device 16, being installed rotatably in relation to the rotary disc 29 when the carrier arm module 9 is fastened on the swivel arm module 7 by means of the first clamping device 16.

According to FIG. 4, the lever clamping gear mechanism 25 comprises an actuating lever 30 for opening and closing of the lever clamping gear mechanism 25, a supporting lever 31 as well as a clamping lever 32 that applies a predetermined clamping force (see FIG. 5) on the carrier arm module 9 for fastening of the first clamping device 16. In the lever clamping gear mechanism 25, the actuating lever 30, the supporting lever 31 and the clamping lever 32 are coupled with one another rotatably on turning points A, B, C, D.

FIG. 5 shows the first clamping device 16 in a closed position, wherein the supporting hooks 26 hold the central beam 10 from below and the clamping lever 32 holds the central beam 10 from above, i.e., on opposite sides of the central beam 10. FIG. 5 further shows that the actuating lever 30 comprises a first section 30a and a second section 30b. The two actuating lever sections 30a, 30b are formed in a way as to enclose essentially a 90° angle. As a consequence, the actuating lever 30 lays itself around the central beam 10 in the closed state of the lever clamping gear mechanism 25 in a way that an additional fixation is achieved for the central beam 10. In particular, the first section 30a thereby fits closely to a side of the central beam 10 that faces away from the holding part 24 in order to prevent the central beam 10 from falling out of the first clamping device 16. From above and together with the clamping lever 32, the second section 30b acts upon the central beam 10 for improved fixation.

In the closed position according to FIG. 5, the turning points A, B, C of the first clamping device 16 are laid in a way that the turning point B between the supporting lever 31 and the actuating lever 30 is located on an imaginary straight line G between the turning point A, which is located on an inlet of the supporting lever 31, and the turning point C, which exists between the clamping lever 32 and the actuating lever 30. Such a position of the turning points A, B, C secures the closed position of the lever clamping gear mechanism 25 due to a closing force that acts on the lever clamping gear mechanism and that is higher than the predetermined clamping force, wherein no automatic opening of the actuating lever 30 is possible. It would thereby be sufficient for the turning point B to be crossed only slightly, i.e., not being crossed through its center by the imaginary straight line G, to create a sufficiently high self-locking effect by means of the clamping device 16 so that it can hold the central beam 10 in a stable way.

Figure 6:
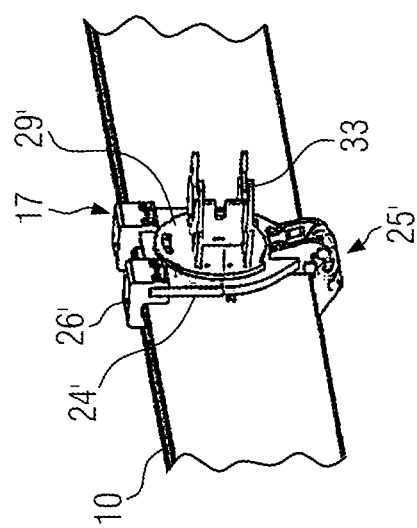
FIG. 6 shows a second clamping device of the holding device.

FIG. 6 shows the second clamping device 17 fastened on the central beam 10, wherein the second clamping device 17 could just as well be fastened on an extension beam 11, 12, 13. The second clamping device 17 has a similar structure as the first clamping device 16. Therefore corresponding reference signs with an apostrophe are used with regard to the second clamping device 17 for comparable components of the two clamping devices 16, 17.

In the second clamping device 17 from FIG. 6, a bracket 33 is fastened on the rotary disc 29'. A lever clamping gear mechanism 34 (see FIGS. 9 and 10) associated to the second clamping device 17 can be fastened in the bracket 33 in order to couple the sensor module 14 to the second clamping device 17.

In FIG. 6, the second clamping device 17 is turned upside down compared to the first clamping device 16 from FIG. 3 so that the supporting hooks 26' are coupled on the central beam 10 from above and the lever clamping gear mechanism 25' from below. In FIG. 6, the rotary disc 29' on the second clamping device 17 is installed rotatably in relation to the holding part 24' to fasten the sensor module 14 on the carrier arm module 9 in a way that it can be swiveled at a predetermined angle through the second clamping device 17. Therefore, in particular an inclined position of the central beam 10 can be compensated to carry the sensor module 14 in a vertical orientation above the ground U and/or above the installed road surface layer 3.

Figure 7:
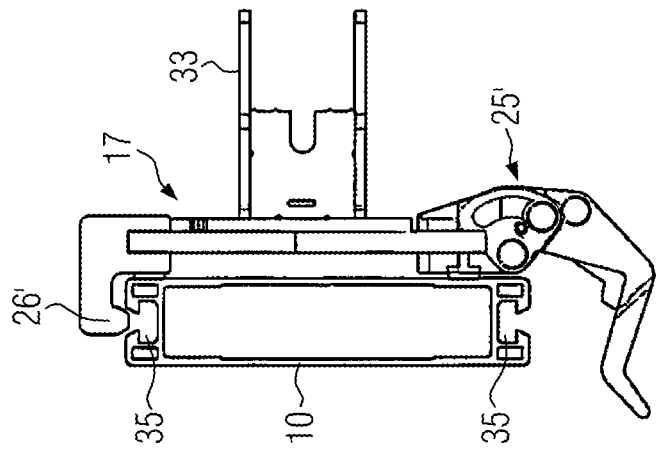
FIG. 7 shows the second clamping device from FIG. 6 on the central beam in an open position.

FIG. 7 shows a section through the second clamping device 17 in relation to the central beam 10. Through the supporting hooks 26', the second clamping device 17 can be suspended excellently at the top of the central beam 10 that is formed as a profile beam. For this purpose, the central beam 10 comprises a recess 35 that is located along the top side of the central beam 10 as well as along the bottom side of the central beam 10. Both the supporting hooks 26, 26' of the first and second clamping devices 16, 17 as well as the clamping levers 32, 32' can hook well into said recess.

Figure 8:
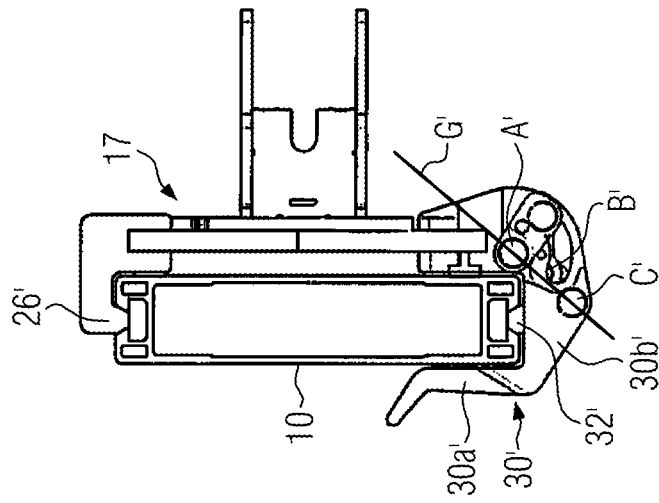
FIG. 8 shows the second clamping device on the central beam in a closed position.

FIG. 8 shows the second clamping device 17 fastened in a closed position on the central beam 10. In FIG. 8, both the supporting hooks 26' as well as the clamping lever 32' are absorbed in the recesses 35 of the upper and lower sides of the central beam 10. The actuating lever 30' is used to additionally secure the central beam 10 in the second clamping device 17 as has already been explained above in connection with the first clamping device 16 of FIG. 5. Likewise, the turning points A', B', C' are located on an imaginary straight line G' in order to protect the lever clamping gear mechanism 25' of the second clamping device 17 against automatic opening.

FIG. 8 illustrates clearly that the lever clamping gear mechanism 25' forms a sort of U-shaped inlet at the bottom of the central beam 10 when the actuating lever 30 has arrived in the closed position. The lever clamping gear mechanism 25' as well as the lever clamping gear mechanism 25 (see FIG. 5) therefore ensures a stable fixation of the central beam 10 in two respects, i.e., on one hand a vertical fixation between the supporting hooks 26, 26' and the clamping lever 32, 32' and on the other hand a horizontal fixation in particular by means of the U-shaped inlet in the lever clamping gear mechanism 25, 25' when said lever clamping gear mechanism is in the closed position. The respective clamping devices 16, 17 can therefore be fastened on the central beam 10 and/or on the extension beam 11, 12, 13 in a particularly reliable way.

FIG. 9 shows a lever clamping gear mechanism 34 that can be used for fixing the sensor tube 18 and that is formed as an eccentric clamping unit for this purpose. The lever clamping gear mechanism 34 is carried by the bracket 33 of the second clamping device 17. Furthermore, it is possible that the lever clamping gear mechanism 34 shown in FIG. 9 can also be used at a different point of the holding device 5, for example as a second lever clamping gear mechanism 17' according to FIGS. 17 to 19.

FIG. 10 shows a section through the lever clamping gear mechanism 34 from FIG. 9. The lever clamping gear mechanism 34 in FIG. 10 is formed as an eccentric quick-release device and is in an open position in FIG. 10. The lever clamping gear mechanism 34 comprises an actuating lever 36 for opening and closing of the lever clamping gear mechanism 34, a supporting lever 37 (in the following also referred to as holding lever 37) as well as a clamping lever 38 that applies a predetermined clamping force for fastening the sensor module 14 on the second clamping device 17 and hence on the carrier arm module 9.

The actuating lever 36 is formed as an eccentric lever by means of whose rotation the clamping lever 38 can be pressed against the sensor tube 18 if said sensor tube is positioned within the lever clamping gear mechanism 34. Further, the actuating lever 36 is formed in a way that it lays itself around the sensor tube 18 in the closed state of the lever clamping gear mechanism 34 (see FIG. 9) so that said sensor tube is fastened in relation to all directions within the lever clamping gear mechanism 34. To maintain the lever clamping gear mechanism 34, in particular the holding lever 37, in an open position in relation to the clamping lever 38, a drawbar 39 is formed between the supporting lever and the clamping lever 38.

In FIG. 10, the actuating lever 36 impacts directly on the clamping lever 38 through a contact point 155 to press said clamping lever against the sensor tube 18. The actuating lever 36 is fastened on a bolt 150 that is connected to a bolt 151 of the holding lever 37 via the drawbar 39. If the actuating lever 36 is used, the bolt 150 will pull on the bolt 151 via the drawbar 39 so that both the clamping lever 38 is pressed against the sensor tube 18 via the eccentric coupling and the holding lever 37 is drawn against the sensor tube 18 as a result.

In FIG. 10, the clamping lever 38 and the holding lever 37 each have front contact points 153, 154 by means of which the sensor tube 18 is pressed in the closed position of the lever clamping gear mechanism 34 against at least one contact point 152, which is formed as an abutment, of the bracket 33.

The lever clamping gear mechanism 34 is formed in a self-aligning way in relation to the clamping tube 18. Therefore, tolerances can be balanced and different sensor tube geometries can be fixed.

FIG. 11 shows a further lever clamping gear mechanism 40 that can be formed both on the first as well as on the second clamping device 16, 17 in order to fix the holding part 24, 24' in relation to the rotary disc 29, 29' against rotation when it is in a closed position, as well as to allow for relative rotatability between the rotary disc 29, 29' and the holding part 24, 24' when it is in an open position. In FIG. 11, the lever clamping gear mechanism 40 is formed as an eccentric clamping device.

The lever clamping gear mechanism 40 from FIG. 11 comprises an actuating lever 41, a supporting lever 42 and a clamp bearing 43. The actuating lever 41 is formed as an eccentric lever that is installed in a way that it can be swiveled around a turning point E. The supporting lever 42 is installed in a way that it can be swiveled around a turning point F. The actuating lever 41 and the supporting lever 42 are next to one another with their turning points E, F being positioned on ends of the levers 41, 42 that face away from one another. The supporting lever 42 is connected to the clamp bearing 43 by means of a bolt 44. A rotary movement of the actuating lever 41 to close the lever clamping gear mechanism 40 is transmitted through the eccentric device on the turning point E onto the support lever 42 and from said support lever via the bolt 44 to the clamp bearing 43 in order to fix the rotary disc 29' on the holding part 24' in a torque-proof way.

In FIG. 11, the clamp bearing 43 is absorbed in sections H of the holding part 24'. The clamp bearing 43 has multiple functions. First, it maintains the rotary disc 29' installed on the holding part 24'. Second, it interacts with the sections H of the holding part 24' as a rotary angle limitation for the rotary disc 29' in relation to the holding part 24'. Third, the clamp bearing 43 can be adjusted by means of closing the actuating lever 41 in a way that the rotary disc 29' is clamped wherein the rotary disc 29' is fixed in a torque-proof way in relation to the holding part 24'.

FIG. 12 shows a lever clamping gear mechanism 34' that is formed similarly to the eccentric clamping device like the lever clamping gear mechanism 34 shown before in connection with FIG. 10 but that is used in a different position of the holding device 5. In the holding device 5, the lever clamping gear mechanism 34' is intended to fasten the sensor unit 6 on a lower end of the sensor tube 18 in order to position the sensor unit 6 above the ground U and/or above the road surface layer 3. For fixing the sensor unit 6 on the sensor tube 18, the lever clamping gear mechanism 34' comprises an actuating lever 36' a holding lever 37' and a clamping lever 38'. Like in the lever clamping gear mechanism 34, the actuating lever 36' is formed as an eccentric lever also in the lever clamping gear mechanism 34' in order to apply a predetermined clamping force on the sensor unit 6 for fixing said sensor unit on the sensor tube 18 by the clamping lever 38' through force transmission to said clamping lever. In particular, the lever clamping gear mechanism 34' can fasten the sensor unit 6 with a similar tongue and groove connection as will be explained later in connection with FIG. 13 and FIG. 14. Just as in FIGS. 13 and 14, a groove is located on the sensor head of the sensor unit 6 in this process.

It would also be possible in this context to equip the lever clamping gear mechanism 34 from FIGS. 9 and 10 with a tongue and groove connection, wherein a plurality of grooves are formed at regular distances on the sensor tube 18 in order to be able to position the sensor tube 18 at different altitudes in relation to said lever clamping gear mechanism. The clamping forces on the lever clamping gear mechanism 34 could be reduced due to the form-closure that can in addition be achieved by the tongue and groove connection.

FIG. 13 shows an alternative lever clamping gear mechanism 45 for the lever clamping gear mechanism 34' from FIG. 12 to fasten the sensor unit 6 at the end of the sensor tube 18. The lever clamping gear mechanism 45 in FIG. 13 comprises an actuating lever 46, a supporting lever 47 and a clamping lever 48 that secures a head 49 of the sensor unit 6 in a sensor inlet 50 that is formed on the lower end of the holding tube 18. FIG. 13 also shows that the sensor unit 6 can be secured in the sensor inlet 50 by means of a tongue and groove connection 51. Therefore, a groove 52, which is positioned at least in sections but preferably all round, is preferably formed on the sensor head 49 and a corresponding spring 53 is formed within the sensor inlet 50.

FIG. 14 shows the lever clamping gear mechanism 45 from FIG. 13 in a closed position. In the closed position, the clamping lever 48 retains the sensor head 49 in the sensor inlet 50. In particular, the tongue and groove connection 51 ensures a vertical fixation of the sensor unit 6 within the sensor inlet 50. FIG. 14 also shows that the turning points A", B", C" are jointly situated on an imaginary straight line G" so that a predetermined closing force, which is preferably greater than the predetermined clamping force that consequently prevents automatic opening of the lever clamping gear mechanism 45, acts in the lever clamping gear mechanism 45.

FIG. 15 shows a swivel arm 8 of the swivel arm module 7 with the swivel arm 8 having a lever clamping gear mechanism 54 on its upper end and a further lever clamping gear mechanism 54' on its lower end. The upper lever clamping gear mechanism 54 is formed to fix the holding tube 27 of the first clamping device 16. The upper lever clamping gear mechanism 54' fixes the swivel arm 8 on a bearing bolt 55 that is formed preferably on the screed arm 4 of the road paver 1.

FIG. 16 shows a section of the lever clamping gear mechanism 54 from FIG. 15 in an enlarged display. The lever clamping gear mechanism 54 comprises an actuating lever 56 that is installed rotatably around a turning point H and that has an eccentric form on said turning point. Further, the lever clamping gear mechanism 54 comprises a clamping lever 57 with a clamping pin 58 attached to it. The clamping lever 57 is installed rotatably around a turning point I and interacts with the eccentric from, which is formed on the end of the actuating lever 56, on its end that is provided at a distance from the turning point I. In the closed position that is shown in FIG. 16, the actuating lever 56 presses on the clamping lever 57 by means of its eccentric device whereby said clamping lever is swiveled around the turning point I in the direction towards the holding tube 27.

As a consequence, the clamping pin 58 presses against the holding tube 27 and fixes said holding tube in relation to the swivel arm 8.

Figure 17:
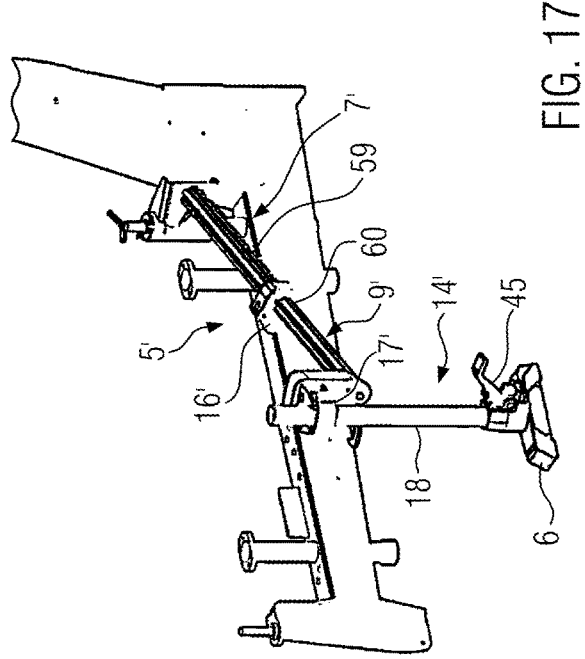
FIG. 17 shows a holding device for a sensor unit with a sliding arm connection.

FIG. 17 shows a further holding device 5' that is fastened detachably on the road paver 1 in addition to or as a substitute for the holding device 5. The holding device 5' comprises a swivel arm module 7' for fastening the holding device 5' on the road paver 1, a carrier arm module 9' and a sensor module 14'. The carrier arm module 9' is fastened on the swivel arm module 7' by means of a first clamping device 16', and the sensor module 14' is fastened on the carrier arm module 9' by means of a second clamping device 17'. In FIG. 17, the swivel arm module 7' comprises a guiding section 59 and the carrier arm module 9' comprises a sliding part 60. The sliding part 60 is installed adjustably along the guiding section 59 and can be fixed on said guiding section by means of the first clamping device 16'.

Figure 18:
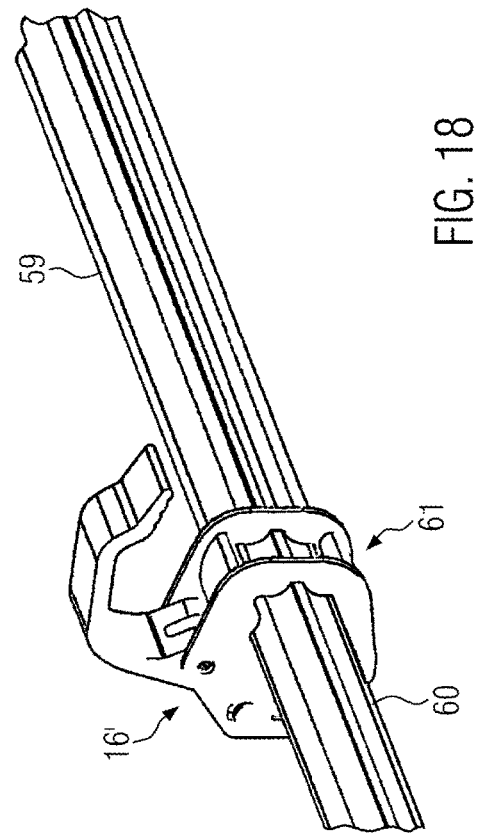
FIG. 18 shows a section of the sliding arm connection from FIG. 17.

FIG. 18 shows the guiding section 59, the sliding part 60 as well as the first clamping device 16' in an enlarged view. In FIG. 18, the sliding part 60 is formed as a profile pipe and the guiding section 59 forms a similar profile according to the sliding part 60. In FIG. 18, the first clamping device 16' comprises a lever clamping gear mechanism 61 that is formed in a similar way as the lever clamping gear mechanism 34' from FIG. 12.

Figure 19:
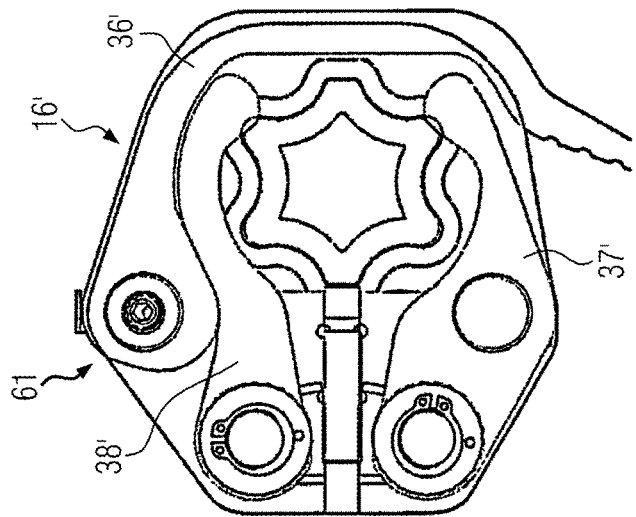
FIG. 19 shows the first clamping device from FIG. 17.

FIG. 19 shows a section through the first clamping device 16' from FIG. 18. The lever clamping gear mechanism 61 applies a predetermined clamping force on a holding lever 37' and a clamping lever 38' by means of an actuating lever 36' that is formed as an eccentric lever and therefore retains the sliding part 60 in relation to the guiding section 59.

In the disclosure, the holding device 5, 5' can be fastened on the road paver 1 in a particularly versatile and ergonomic way. Although no major actuating forces have to be applied on the respective clamping devices of the disclosure, said clamping devices reliably retain components that are coupled to them. In particular, an operator does not need any additional tools for assembly and/or disassembly of the respective holding device 5, 5' so that his work at the construction site can be eased. Apart from being used on the road paver 1, the holding device 5, 5' is also suitable for fastening on other vehicles, in particular on a feeding vehicle for a road paver.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A road paver comprising:
a height-adjustable paving screed for installing a road surface layer; and
a holding device for carrying and positioning a sensor unit, wherein the holding device has a swivel arm module for fastening the holding device on a portion of the road paver, a carrier arm module and a sensor module comprising the sensor unit, wherein the carrier arm module is fastened on the swivel arm module by means of a first clamping device and the sensor module is fastened on the carrier arm module by means of a second clamping device, wherein the first clamping device and the second clamping device are each formed to apply a predetermined clamping force when the respective clamping device is in a closed position.

2. The road paver according to claim 1 wherein the first and second clamping devices are each quick-release devices.

3. The road paver according to claim 1 wherein the predetermined clamping force of each clamping device is independent of an actuating force on the respective clamping device to set the clamping device to the closed position.

4. The road paver according to claim 1 wherein the first clamping device and/or the second clamping device comprise/comprises a lever clamping gear mechanism.

5. The road paver according to claim 4 wherein the lever clamping gear mechanism comprises an actuating lever for opening and closing the respective clamping device, a supporting lever as well as a clamping lever that applies the predetermined clamping force for fastening on the carrier arm module.

6. The road paver according to claim 5 wherein the first clamping device and/or the second clamping device comprise/comprises at least one supporting hook that is formed as an abutment for fixation on the carrier arm module.

7. The road paver according to claim 6 wherein the clamping lever and the supporting hook are coupled to the carrier arm module on opposite sides of the carrier arm module when the first clamping device and/or the second clamping device are/is closed.

8. The road paver according to claim 7 wherein in the closed position of the first clamping device and/or the second clamping device turning points of the lever clamping gear mechanism are laid in a way that a first turning point located between the supporting lever and the actuating lever is located at least partially on an imaginary straight line between a second turning point, which is located on an inlet of the supporting lever, and a third turning point that exists between the clamping lever and the actuating lever.

9. The road paver according to claim 1 wherein a central beam of the carrier arm module, which is aligned obliquely when viewed in a vertical projection plane, can be fastened on the first clamping device and/or the second clamping device and/or wherein the first clamping device and/or the second clamping device have/has a holding part and a rotary disc coupled to the holding part, wherein the holding part and the rotary disc are installed rotatably in relation to one another within a predetermined angle.

10. The road paver according to claim 9 wherein on the first clamping device the holding part is installed rotatably in relation to the rotary disc when the carrier arm module is fastened on the swivel arm module by means of the first clamping device and wherein on the second clamping device the rotary disc is installed rotatably in relation to the holding part when the sensor module is fastened on the carrier arm module by means of the second clamping device.

11. The road paver according to claim 10 wherein the holding part and the rotary disc can be fixed against rotation in relation to one another.

12. The road paver according to claim 1 wherein the second clamping device has a holding part and a rotary disc that are installed rotatably in relation to one another within a predetermined angle, wherein the second clamping device further comprises a lever clamping gear mechanism formed on the rotary disc, and wherein the lever clamping gear mechanism is an eccentric quick-release device for absorbing a sensor tube of the sensor module.

13. The road paver according to claim 1 wherein the sensor module comprises a sensor inlet, wherein the sensor unit can be positioned in the sensor inlet by means of a tongue and groove connection and/or wherein the sensor unit can be fixed against rotation on a lever clamping gear mechanism associated with the sensor module.

14. The road paver according to claim 1 wherein the swivel arm module has a guiding section at least in sections and wherein the carrier arm module comprises a sliding part that is installed adjustably along the guiding section and that can be fixed on the guiding section by means of the first clamping device.

15. The road paver according to claim 14 wherein the sliding part is a profile tube and the guiding section is hollow for absorbing the profile tube.

16. A road paver comprising:
a holding device for carrying and positioning a sensor unit, wherein the holding device has a swivel arm module for fastening the holding device on a portion of the road paver, a carrier arm module and a sensor module comprising the sensor unit, wherein the carrier arm module is fastened on the swivel arm module by a first clamping device and the sensor module is fastened on the carrier arm module by a second clamping device, and wherein the first clamping device and the second clamping device are each formed to provide a predetermined clamping force when the respective clamping device is in a closed position.

* * * * *